J. R. ROGERS.
Broadcast-Seeder.
No. 41,321. Patented Jan. 19, 1864.
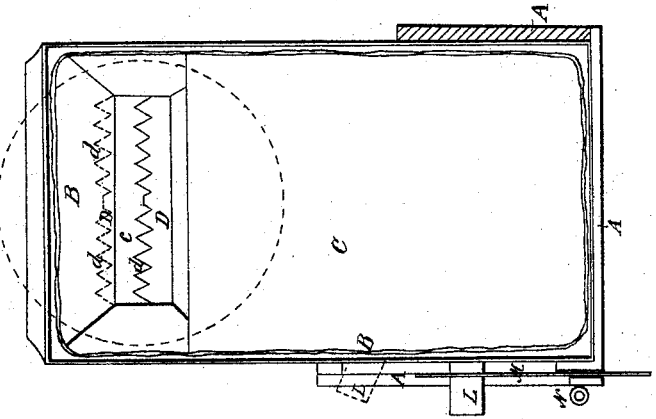
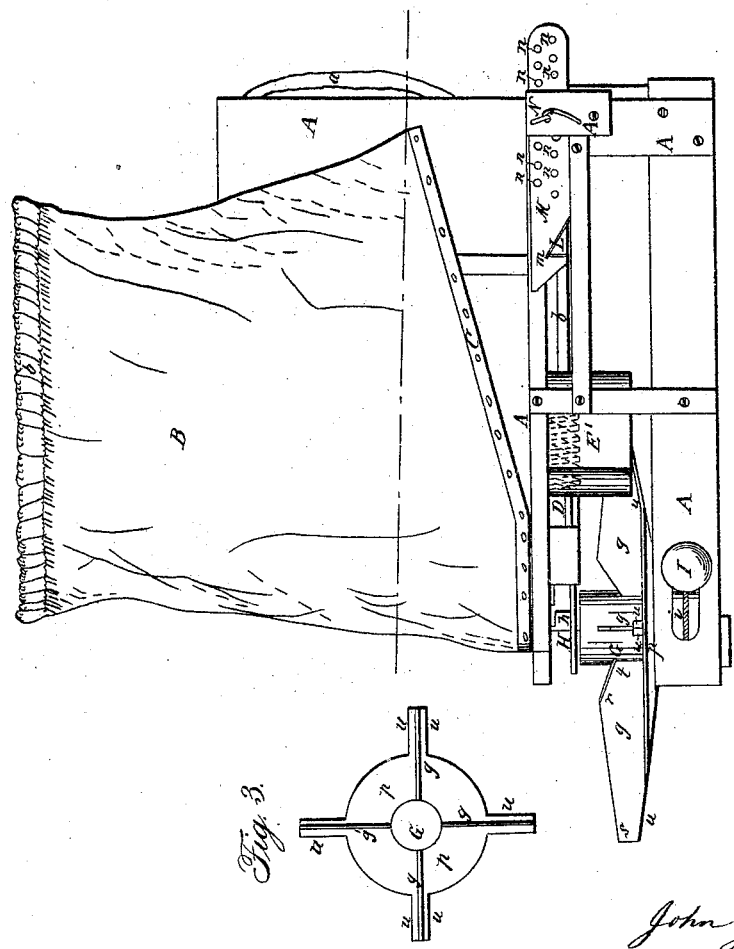
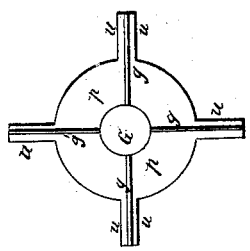
Witnesses:
Wm. F. Brown
James Dorvin
Inventor:
John R. Rogers
By his attys
J. F. Brown.

UNITED STATES PATENT OFFICE.

JOHN R. ROGERS, OF BERLIN, WISCONSIN.

IMPROVEMENT IN BROADCAST SEED-SOWERS.

Specification forming part of Letters Patent No. 41,321, dated January 19, 1864.

*To all whom it may concern:*

Be it known that I, JOHN R. ROGERS, of Berlin, in the county of Green Lake and State of Wisconsin, have invented certain new and useful Improvements in Hand or Portable Broadcast Seed-Sowers; and I do hereby declare that the following is a full and exact description thereof, reference being had to the accompanying drawings, making part of this specification—

Figure 1 being a side elevation of a broadcast seed-sower provided with my improvements; Fig. 2, a horizontal section thereof in the plane indicated by the line $xx$, Fig. 1; Fig. 3, a plan of the seeding-wheel detached.

Like letters designate corresponding parts in all of the figures.

This improved machine is constructed to operate on the same general principle as the broadcast seed-sower patented by me on the 6th day of March, 1860, and the present features of improvement are made upon that machine. Thus the frame A may be as there constructed, or in any other suitable and convenient manner, and it is applied to the left side of the operator in a similar manner by means of a strap, $a$. The bag-hopper B, also, is constructed nearly as before, but is somewhat improved thereon, in having a narrower mouth and bulging more below the same, and in having a round stiffener, $b$, at the mouth to render the hopper easier to fill and less liable to spill the seed therefrom. The seeding-wheel G also operates in the same way as in that machine, by percussion, being driven alternately in opposite directions by the rod I and cord $i$, in like manner with the springs on the ends of the rod, to speedily check the momentum of the wheel and enable its motion to be quickly and easily reversed.

My first main improvement upon the former machine consists in dispensing with the greater part of the dishing bottom of the wheel, retaining only the minor portion $p$ thereof immediately around the shaft, where some of the grains are flung back toward the center by the concave E at the rear of the wheel, and, consequently losing their centrifugal motion, are liable to fall directly to the ground, instead of being properly thrown off, and besides this central portion retaining only a narrow ledge, $u$, at the bottom of each radial wing on each side out to the extremity thereof, in order to properly sustain the grains, while for the moment remaining in contact with the wings in rebounding from one to the other, the rest of the space between the percussion-wings $gg$ requiring no bottom. Since the grains in falling are struck and driven off by percussion before they can fall through the wheel, I am enabled to take advantage of that principle of the wheel's action to dispense with much of the bottom heretofore employed, and thereby lighten the wheel to a considerable extent, so as to render the wheel easier to change directions and make it much freer and lighter to operate. I find this to be an important improvement and valuable.

The next improvement consists in making the percussion-wings $gg$ highest at a point, $r$, some distance from the shaft, or about where the seed drops through the throat $c$, Fig. 1, of the hopper, and not only sloping downward therefrom to the outer extremity, $s$, but also inward to the shaft at $t$. The object of this is not only to throw off the grain evenly at all points outward from the highest point, $r$, but inside thereof, to prevent the action of percussion from sending off the grains which fall inside of that point, since the centrifugal action there is not sufficient to throw off the grain to the proper distance, but would cause it to pass out irregularly without velocity, and consequently to lodge too much under the feet of the operator. As seen in Fig. 2, I now have the throat $c$ entirely clear from side to side, so that the grain falls without obstruction in a thin broad sheet across nearly the whole width of the percussion-wheel or its closed port. I communicate to the regulating slide-gate D a rapid transverse shaking motion by means of the eccentric $h$, on the shaft of the wheel, turning in a narrow slot in a plate, H, projecting forward from the slide-gate D. The action is the same as described in my former Letters Patent.

Instead of regulating the slide D with the hand solely by means of a hinged lever, as before, I make use of the following improved arrangement, which constitutes another feature of the present invention.

The regulator D has a rod, $l$, Fig. 1, reaching back to a latch-lever, L, which is hinged at one end to the frame A, while the other end projects somewhat from the left side of the machine. A coiled spring, E', (shown by dotted lines in Fig. 1,) is located on the connecting-rod $l$, so as to spring the gate D forward, and when free to act to cause it to completely close the throat $c$ of the hopper, as indicated by red lines in Fig. 2, when it is desired to stop the machine. A catch, M, is hinged to the frame at N, and is provided with a notch, $m$, to hold the latch-lever L back, as shown in Fig. 1, when the machine is operating. The catch M has a series of holes, $n$ $n$, at uniform short distances apart, through any one of which the pivot N may pass, and thus lengthen or shorten the latch, as desired. The effect of changing the pin N to different holes $n$ $n$ is to hold the latch L back to different positions, and consequently to cause the gate D to open the throat $c$ of the hopper more or less, and thereby vary the amount of seed let down upon the seeding-wheel G in a given time and sown upon the ground. The holes $n n$ may be graduated and numbered, so as to accurately indicate what amount of grain will be sown to the acre by making the different holes serve for the axis of the catch. This arrangement is easily managed with the left hand of the operator, is always sure in its action, either holding the gate uniformly opened or firmly closed, and the seed thereby can be cut off instantaneously at any time.

I disclaim merely closing the central portion of the percussion-wheel and the use of the ledges $u$ $u$ when these two features are not in combination; but

What I claim as my invention, and desire to secure by Letters Patent, is—

1. The construction of the bottom of the percussion-wheel G so as to close only the inner portion of the same around the shaft and have narrow ledges $u$ $u$ at the sides of the wings the remainder of the radial distance to the periphery of the wheel, substantially as and for the purpose herein specified.

2. The construction, arrangement, and combination of the sliding gate D, spring E', latch L, and adjustable graduated catch M, substantially in the manner and for the purposes herein specified.

The above specification signed by me this 4th day of June, 1862.

JOHN R. ROGERS.

Witnesses:
C. A. MATHER,
JOSEPH YATES,
JAMES NUTTING.